US010003369B2

(12) United States Patent
Ooi et al.

(10) Patent No.: US 10,003,369 B2
(45) Date of Patent: Jun. 19, 2018

(54) PORTABLE, WEARABLE RADIO

(71) Applicant: MOTOROLA SOLUTIONS, INC., Chicago, IL (US)

(72) Inventors: Lee Sun Ooi, Kedah (MY); Wooi Ping Teoh, Penang (MY); Wai Mun Lee, Penang (MY); Guo Dong Gan, Kuala Lumpur (MY); Bing Qin Lim, Pulau Pinang (MY); Teck Yem Lee, Penang (MY); Michael J. Page, Miami, FL (US)

(73) Assignee: MOTOROLA SOLUTIONS, INC., CHICAGO, IL (US)

( * ) Notice: Subject to any disclaimer, the term of this patent is extended or adjusted under 35 U.S.C. 154(b) by 0 days. days.

(21) Appl. No.: 15/542,025

(22) PCT Filed: Mar. 22, 2016

(86) PCT No.: PCT/MY2016/000013
§ 371 (c)(1),
(2) Date: Jul. 6, 2017

(87) PCT Pub. No.: WO2017/164727
PCT Pub. Date: Sep. 28, 2017

(65) Prior Publication Data
US 2018/0109277 A1    Apr. 19, 2018

(51) Int. Cl.
*H04B 1/3827*  (2015.01)
*G08B 25/01*   (2006.01)
(Continued)

(52) U.S. Cl.
CPC .......... *H04B 1/385* (2013.01); *G08B 25/016* (2013.01); *A45F 2003/146* (2013.01);
(Continued)

(58) Field of Classification Search
CPC ........ H04B 1/38; H04B 1/385; H04B 1/3827; H04B 1/3838; H04B 1/3855; G08B 25/00;
(Continued)

(56) References Cited

U.S. PATENT DOCUMENTS 2,285,083 A    6/1942  Cover, Sr.
2,541,042 A    2/1951  Curtis
(Continued)

FOREIGN PATENT DOCUMENTS

WO    2016/038341    3/2016

OTHER PUBLICATIONS

PCT/MY2016/000013 International Search Report and Written Opinion of the International Searching Authority dated Nov. 17, 2016 (10 pages).

*Primary Examiner* — Thanh Le
(74) *Attorney, Agent, or Firm* — Michael Best & Friedrich LLP (57) ABSTRACT

A portable, wearable radio includes a modular harness having the flexibility to be reconfigured into a plurality of different profiles, the modular harness having an interior and a plurality of radio components removably disposed within the interior of the modular harness. The plurality of radio components includes a first radio component, a second radio component electrically coupled to the first radio component via a first flexible electrical connector, and a third radio component electrically coupled to the first radio component via at least one of a group selected from the first flexible electrical connector and a second flexible electrical connector.

25 Claims, 12 Drawing Sheets

(51) Int. Cl.
*A45F 4/00* (2006.01)
*A45F 3/14* (2006.01)

(52) U.S. Cl.
CPC . *A45F 2004/006* (2013.01); *A45F 2200/0516* (2013.01); *H04B 2001/3872* (2013.01)

(58) Field of Classification Search
CPC ....... G08B 25/016; G08B 25/08; A45C 11/00; A45C 2011/001; A41D 1/005
See application file for complete search history.

(56) References Cited

U.S. PATENT DOCUMENTS

| | | | |
|---|---|---|---|
| 2,571,514 A | 10/1951 | Andrews | |
| 3,868,573 A | 2/1975 | Holcomb et al. | |
| 4,041,394 A | 8/1977 | Pate | |
| 5,798,907 A | 8/1998 | Janik | |
| 6,443,347 B1 | 9/2002 | Elizalde et al. | |
| 6,895,261 B1 * | 5/2005 | Palamides | H04B 1/385 455/100 |
| 6,972,725 B1 * | 12/2005 | Adams | H01Q 1/273 343/718 |
| 7,440,581 B2 * | 10/2008 | Wiener | H04R 5/023 381/301 |
| 8,341,762 B2 * | 1/2013 | Balzano | A41D 1/005 2/102 |
| 2005/0062659 A1 * | 3/2005 | Packer | H04B 1/385 343/718 |
| 2017/0054461 A1 * | 2/2017 | Kovac | H04B 1/385 |

* cited by examiner

PORTABLE, WEARABLE RADIO

BACKGROUND OF THE INVENTION

Portable radios such as, for example, two-way radios, land mobile radios, and the like are often worn on a belt (using, for example, a belt clip) or are otherwise attached to a user's clothing. Wearing a portable radio in this fashion relieves an operator from carrying the portable radio in his or her hands. However, portable radios can be bulky, and include corded accessories (for example, a remote speaker microphone). The bulky nature of the portable radio may restrict movement of the user. Additionally, in many instances the user may still be required to hold the portable radio in his or her hands while using the portable radio to communicate with others.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A portable, wearable radio includes a modular harness having the flexibility to be reconfigured into a plurality of different profiles, the modular harness having an interior, and a plurality of radio components removably disposed within the interior of the modular harness. The plurality of radio components includes a first radio component, a second radio component electrically coupled to the first radio component via a first flexible electrical connector, and a third radio component electrically coupled to the first radio component via at least one of a group selected from the first flexible electrical connector and a second flexible electrical connector.

Figure 1:
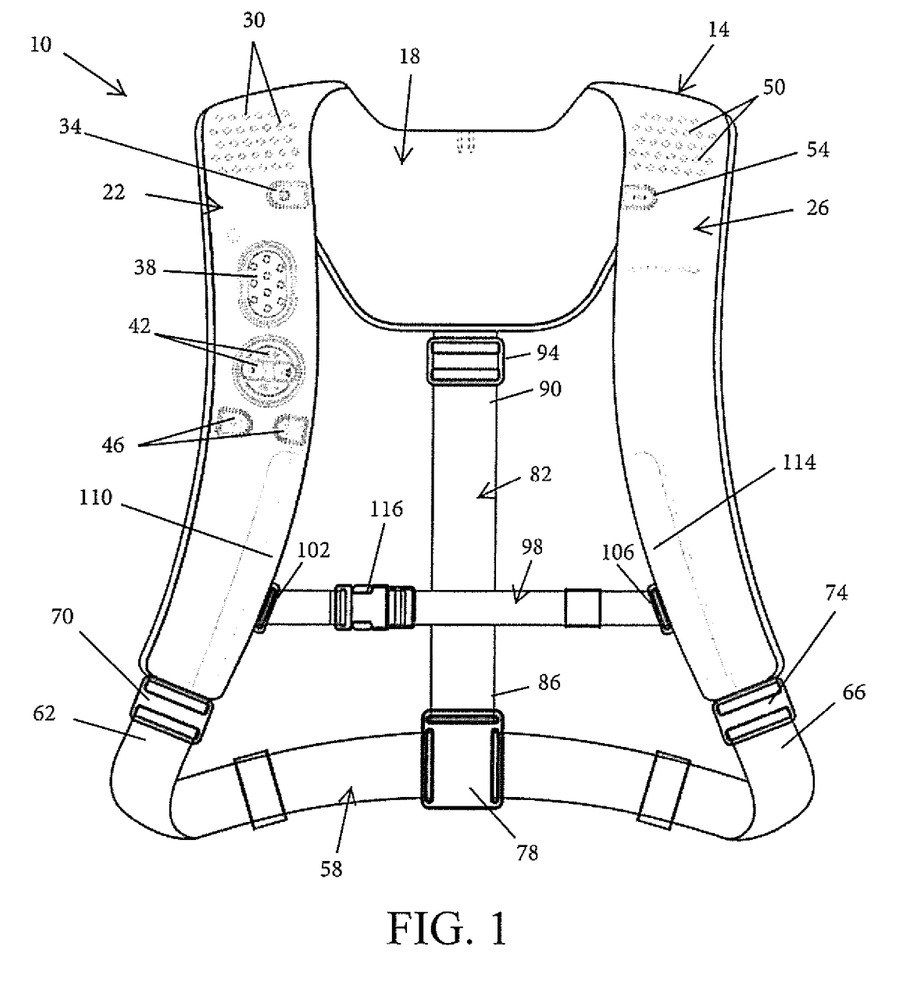
FIG. 1 is a front view of a portable, wearable radio that includes a harness in accordance with one embodiment.
Figure 2:
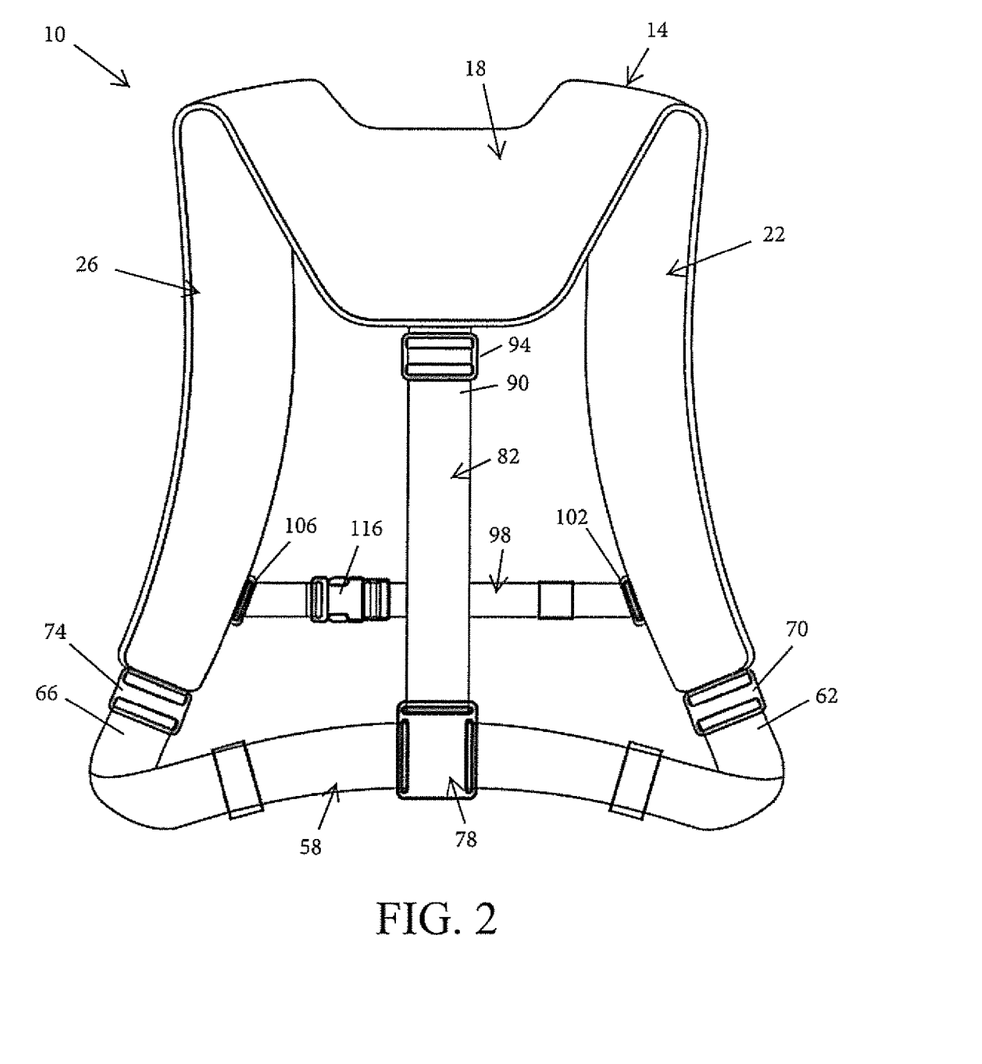
FIG. 2 is a rear view of the portable, wearable radio of FIG. 1.

FIGS. 1 and 2 illustrate one example of a portable, wearable radio 10. In the example illustrated, the portable, wearable radio 10 includes a harness 14. The harness 14 is a modular harness having the flexibility to be reconfigured into a plurality of different profiles. In the illustrated embodiment, the harness 14 includes a neck strap 18, a first shoulder strap 22 coupled to the neck strap 18, and a second shoulder strap 26 coupled to the neck strap 18. The first shoulder strap 22 and the second shoulder strap 26 are integrally formed in one piece with the neck strap 18. However, in some embodiments the first shoulder strap 22 and/or the second shoulder strap 26 are removably coupled to the neck strap 18 (for example, with Velcro® hook and loop fasteners, buttons, or other structures).

In one embodiment, the neck strap 18 is formed from a flexible, washable (for example, machine-washable) and waterproof material. In other embodiments the neck strap 18 may be formed from different materials. In some embodiments, the neck strap 18 provides a soft, comfortable, yet firm support against an operator's neck and/or upper back. While the neck strap 18 illustrated has a generally V-shaped profile, other embodiments include different shapes and/or profiles than the profile illustrated.

The first shoulder strap 22 is configured to be worn over an operator's right shoulder. Like the neck strap 18, the first shoulder strap 22 may be formed from a flexible, washable (for example, machine-washable), and waterproof material although other embodiments may include different materials. As illustrated in FIG. 1, the first shoulder strap 22 includes a first set of speaker and microphone apertures 30, a press-over power button 34, a press-over push-to-talk button 38, press-over channel and volume adjustment buttons 42, and press-over programmable buttons 46. The press-over buttons (for example, the press-over power button 34, press-over push-to-talk button 38, press-over channel and volume adjustment buttons 42, and/or press-over programmable buttons 46) can be any other user-triggered type of buttons, for example touch sensing buttons. In some embodiments, instead of having a press-over button or buttons, the first shoulder strap 22 instead includes one or more covers or openings to receive one or more buttons underneath.

The second shoulder strap 26 is configured to be worn over the operator's left shoulder. The second shoulder strap 26 may be formed from the various materials noted herein from which the neck strap 18 and first shoulder strap 22 may be formed. The second shoulder strap 26 includes a second set of speaker and microphone apertures 50, and a press-over emergency button 54. The press-over button (for example, the press-over emergency button 54) can be any other user-triggered type of button, for example a touch sensing button. In some embodiments, instead of having a press-over button, the second shoulder strap 26 instead includes one or more covers or openings to receive one or more buttons underneath.

With continued reference to FIGS. 1 and 2, the harness 14 includes a main adjustment strap 58 having a first main adjustment strap end 62 coupled to the first shoulder strap 22 and a second main adjustment strap end 66 coupled to the second shoulder strap 26. A first main adjustment strap buckle 70 is provided adjacent the first shoulder strap 22, a second main adjustment strap buckle 74 is provided adjacent the second shoulder strap 26, and a third main adjustment strap buckle 78 is provided centrally between the first and second main adjustment strap buckles 70, 74. The first, second, and third main adjustment strap buckles 70, 74, 78 guide the main adjustment strap 58, and are used to adjust and/or tighten the main adjustment strap 58 around an operator's waist.

The harness 14 further includes a back adjustment strap 82 that is coupled to the third main adjustment strap buckle 78 at a first back adjustment strap end 86 and is coupled to the neck strap 18 at a second back adjustment strap end 90. A back adjustment strap buckle 94 is provided adjacent the neck strap 18. The back adjustment strap buckle 94 and the third main adjustment strap buckle 78 are used to adjust and/or tighten the back adjustment strap 82 to fit a height of the operator.

The harness 14 further includes a chest adjustment strap 98 that is coupled to the first shoulder strap 22 at a first chest adjustment strap end 102 and to the second shoulder strap 26 at a second chest adjustment strap end 106. The first chest adjustment strap end 102 is movable (for example, slidable up and down relative to an operator's chest) along a first rail 110 on the first shoulder strap 22. Similarly, the second chest adjustment strap end 106 is movable (for example, slidable up and down relative to an operator's chest) along a second rail 114 on the second shoulder strap 26. This adjustability allows the chest adjustment strap 98 to be placed at a desired location relative to the operator's chest. Other embodiments do not include the first rail 110 and the second rail 114. In some embodiments, structures other than rails permit adjustment of the chest adjustment strap 98. As illustrated in FIG. 1, the chest adjustment strap 98 further includes a chest adjustment strap buckle 116, which allows the chest adjustment strap 98 to be separated and buckled together as needed when taking the harness 14 on and off.

In some embodiments, one or more of the main adjustment strap 58, the back adjustment strap 82, and the chest adjustment strap 98 are removable from the remainder of the harness 14, so that the harness 14 may be reconfigured into a different profile. For example, in some embodiments, the first main adjustment strap end 62 is removably coupled to the first shoulder strap 22 with Velcro® hook and loop fasteners, buttons, or other structures, and the second main adjustment strap end 66 is removably coupled to the second shoulder strap 26 with Velcro® hook and loop fasteners, buttons, or other structures. In some embodiments, the second back adjustment strap end 90 is removably coupled to the neck strap 18 with Velcro® hook and loop fasteners, buttons, or other structures.

Figure 3:
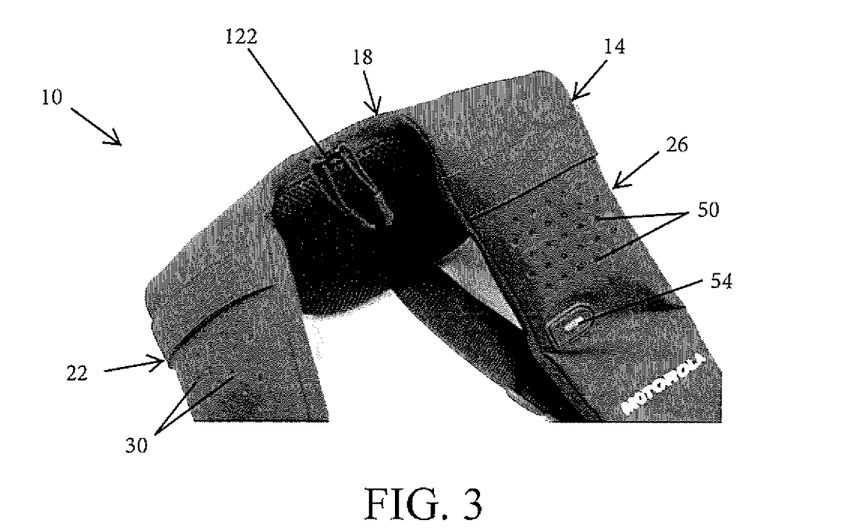
FIGS. 3 and 4 are partial, perspective views of the portable, wearable radio of FIG. 1, illustrating a zipper and an interior of the harness.
Figure 4:
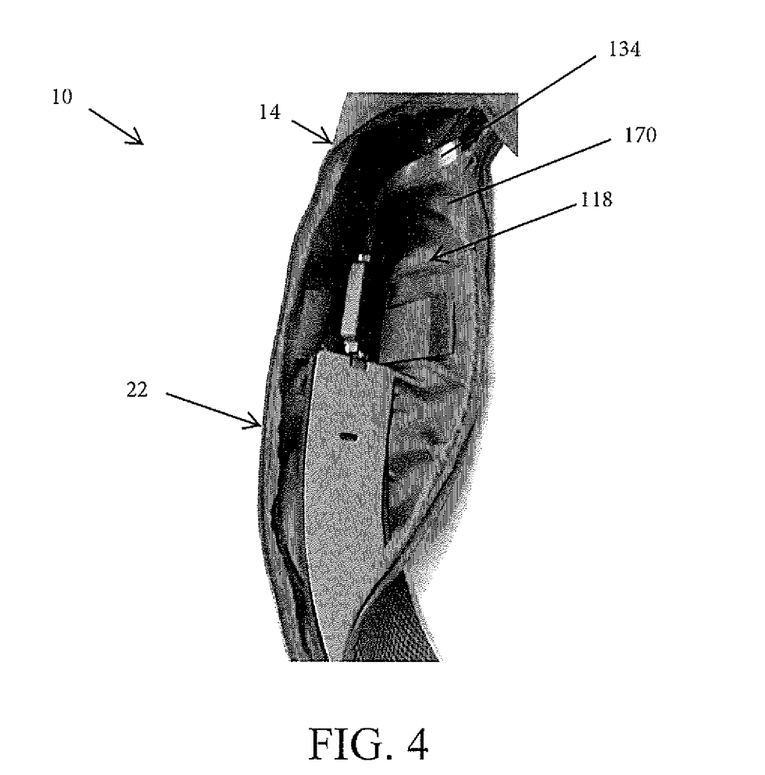

With reference to FIGS. 3 and 4, the harness 14 further includes an interior 118. The interior 118 is an open space or area within the harness 14 sized to receive one or more radio components. In the illustrated embodiment, the harness 14 includes a zipper 122 along at least a portion of the neck strap 18. When the zipper 122 is pulled open, as illustrated in FIG. 4, the interior 118 is exposed and is visible and accessible. When the zipper 122 is pulled completely shut, the interior 118 is closed off, or is substantially closed off. As illustrated in FIG. 4, the interior 118 extends from the neck strap 18 into the first shoulder strap 22 (and also into the second shoulder strap 26 on the other side of the neck strap 18). While the illustrated embodiment includes a zipper 122, other embodiments include different structures, including but not limited to buttons and the like to securely close the interior 118 and/or seal the interior 118 from an external environment.

Figure 5:
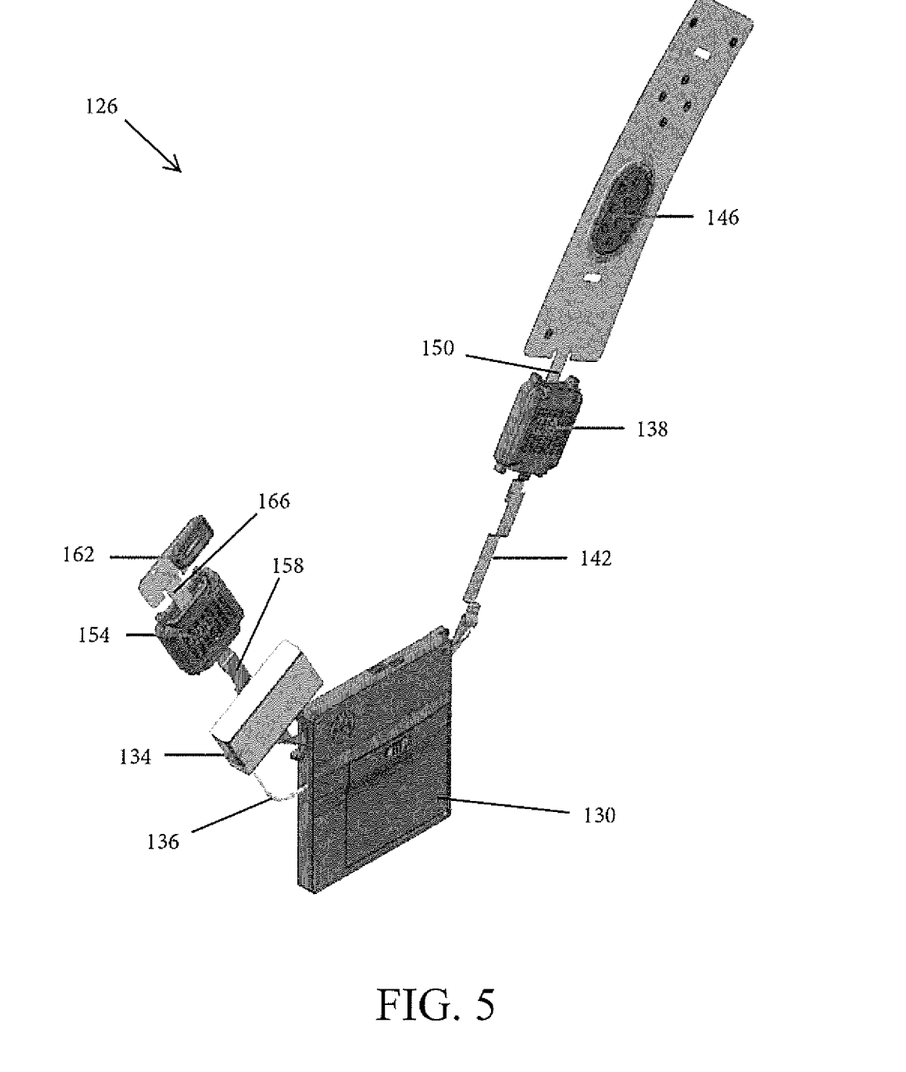
FIG. 5 is perspective view of a radio system that includes a plurality of radio components that are removably inserted into the harness.

With reference to FIG. 5, the portable, wearable radio 10 further includes a radio system 126 (for example a land mobile radio (LMR) system, a long-term evolution (LTE) radio system and the like) that is removably disposed within the interior 118, and is substantially or entirely concealed when the zipper 122 is pulled completely shut. The radio system 126 is modular, and includes a plurality of radio components. In the illustrated embodiment, the radio system 126 includes a control unit 130 includes both a power supply and an electronic controller (for example, a microprocessor, memory, and input and output devices). In the illustrated embodiment the power supply is a wirelessly rechargeable battery, although other embodiments include different power supplies (for example, multiple batteries, non-rechargeable batteries and the like). When the radio system 126 is disposed within the interior 118, the control unit 130 is positioned within the neck strap 18. In other embodiments, the control unit 130 is positioned within the first shoulder strap 22, the second shoulder strap 26, or elsewhere within or on the harness 14.

With continued reference to FIG. 5, the radio system 126 further includes a radio frequency module 134. The radio frequency module 134 is electrically connected to the control unit 130 via a first flexible electrical connector 136 (for example, a wire or an electrical ribbon). When the radio system 126 is disposed within the interior 118, the radio frequency module 134 is positioned within the neck strap 18. In other embodiments the radio frequency module 134 is positioned within the first shoulder strap 22, the second shoulder strap 26, or elsewhere within or on the harness 14.

With continued reference to FIG. 5, the radio system 126 further includes a first speaker-microphone 138. The first speaker-microphone 138 is coupled to the control unit 130 via a second flexible electrical connector 142 (for example, a wire or an electrical ribbon). In the illustrated embodiment, the first speaker-microphone 138 includes both a speaker and a microphone in a single housing. However, in other embodiments, a separate speaker and a separate microphone are provided. When the radio system 126 is disposed within the interior 118, the first speaker-microphone 138 is positioned within the first shoulder strap 22, such that the first speaker-microphone 138 is disposed directly underneath the first set of speaker and microphone apertures 30 (see FIGS. 1 and 3). This arrangement positions the first speaker-microphone 138 generally on the operator's shoulder, in close proximity to the operator's mouth and ear, to enhance audio quality. In other embodiments the first speaker-microphone 138 is positioned within the neck strap 18, or elsewhere within or on the harness 14.

With continued reference to FIG. 5, the radio system 126 further includes a push-to-talk button 146. The push-to-talk button 146 is coupled to the first speaker 138 via a third flexible electrical connector 150 (for example, a wire or an electrical ribbon). When the radio system 126 is disposed within the interior 118, the push-to-talk button 146 is disposed directly underneath the press-over push-to-talk button 38 (see FIG. 1). In some embodiments the push-to-talk button 146 is disposed in the second shoulder strap 26, in the neck strap 18, or elsewhere within or on the harness 14. In some embodiments, multiple push-to-talk buttons 146 are disposed on one or more of the neck strap 18, first shoulder strap 22, and/or second shoulder strap 26.

In the example illustrated in FIG. 5, the radio system 126 further includes a second speaker-microphone 154. The second speaker-microphone 154 is coupled to the control unit 130 with a fourth flexible electrical connector 158 (for example, a wire or an electrical ribbon). Like the first speaker-microphone 138, the second speaker-microphone 154 includes both a speaker and a microphone in a single housing. In other embodiments, a separate speaker and separate microphone are provided. When the radio system 126 is disposed within the interior 118, the second speaker 154 is positioned within the second shoulder strap 26, such that the second speaker-microphone 154 is disposed directly underneath the second set of speaker and microphone apertures 50 (see FIGS. 1 and 3). This arrangement positions the second speaker-microphone 154 generally on the operator's shoulder, in close proximity to the operator's mouth and ear, to enhance audio quality. In other embodiments the second speaker-microphone 154 is disposed in the first shoulder strap 22, the neck strap 18, or elsewhere within or on the harness 14. In some embodiments, only a single speaker-microphone is provided in the harness 14 (for example, the first speaker-microphone 138 or the second speaker-microphone 154). In other embodiments, multiple speaker-microphones, multiple speakers, multiple microphones, or a combination of the same are provided on or within one or more areas of the harness 14.

With continued reference to FIG. 5, the radio system 126 further includes an emergency button 162. In the embodiment, illustrated, the emergency button 162 is coupled to the second speaker-microphone 154 via a fifth flexible electrical connector 166 (for example, a wire or an electrical ribbon). When the radio system 126 is disposed within the interior 118, the emergency button 162 is positioned within the second shoulder strap 26, such that the emergency button 162 is disposed directly underneath the press-over emergency button 54 (see FIGS. 1 and 3). In other embodiments, the emergency button 162 is disposed in the first shoulder strap 22, the neck strap 18, or elsewhere within or on the harness 14. In some embodiments, multiple emergency buttons 162 are provided on or within one or more areas of the harness 14.

With reference to FIG. 4, in the illustrated embodiment the harness 14 further includes one or more chambers 170 (for example, pockets) disposed within the interior 118. The chambers 170 are used to hold and/or secure one or more of the components of the radio system 126. For example, as illustrated in FIG. 4, the radio frequency module 134 is disposed within one chamber 170. Other embodiments do not include chambers 170. In some embodiments other structures are provided that help to hold and/or secure the components of the radio system 126. In some embodiments, the chambers 170, or certain areas of the harness 14, are more rigid than other areas, to provide added stability.

In some embodiments, including those shown in FIG. 1 through FIG. 5, the harness 14, as well as at least portions of the radio system 126 overall, are generally symmetrical or have a symmetrical configuration. Such a symmetrical configuration helps to distribute the weight of the portable, wearable radio 10 on the operator, and facilitates overall comfort and ease of use of the portable, wearable radio 10.

Figure 6:
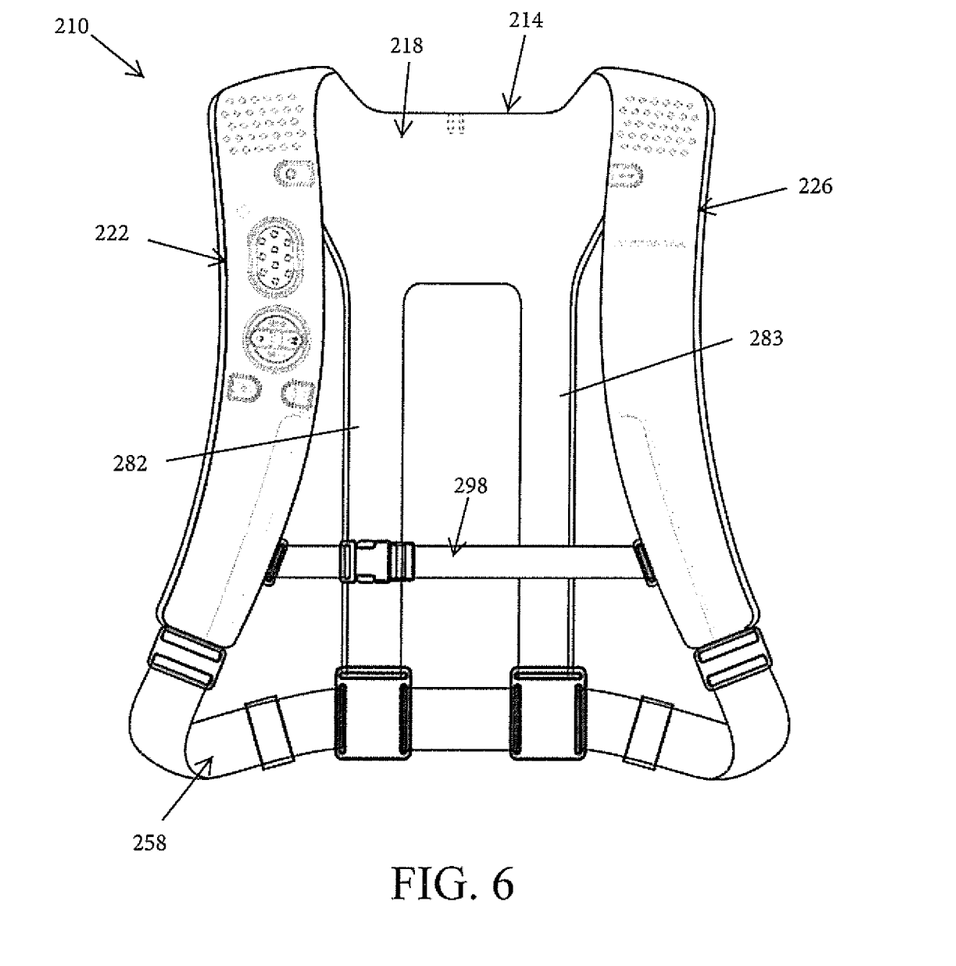
FIG. 6 is a front view of a portable, wearable radio in accordance with another embodiment, including two back adjustment straps.
Figure 7:
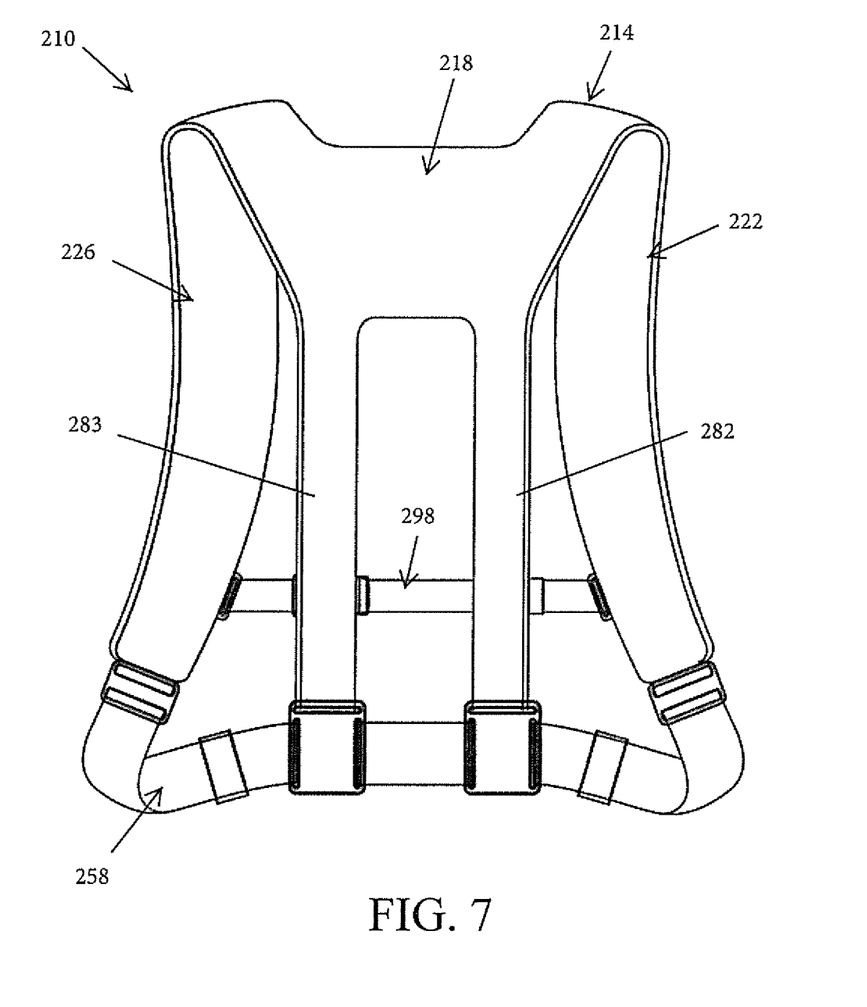
FIG. 7 is a rear view of the portable, wearable radio of FIG. 6.

FIG. 6 and FIG. 7 illustrate another embodiment in the form of a portable, wearable radio 210. The portable, wearable radio 210 includes a harness 214 having a neck strap 218, a first shoulder strap 222 coupled to the neck strap 218, and a second shoulder strap 226 coupled to the neck strap 218. The harness 214 further includes a main adjustment strap 258 and a chest adjustment strap 298. The portable, wearable radio 210 is similar to the portable, wearable radio 10, with the exception of having both a first back adjustment strap 282 and a second back adjustment strap 283 instead of the single back adjustment strap 82 illustrated in FIGS. 1 and 2. In some embodiments the first back adjustment strap 282 and/or the second back adjustment strap 283 are removable from the remainder of the harness 214, so that the harness 214 may be reconfigured into a different profile.

Figure 8:
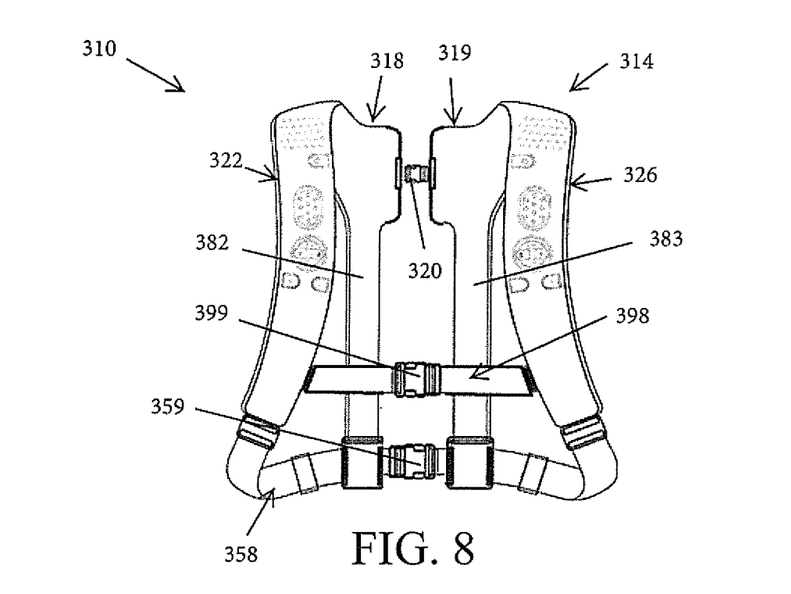
FIG. 8 is a front view of a portable, wearable radio in accordance with another embodiment, including a harness having a first neck strap and a second neck strap removably coupled together.
Figure 9:
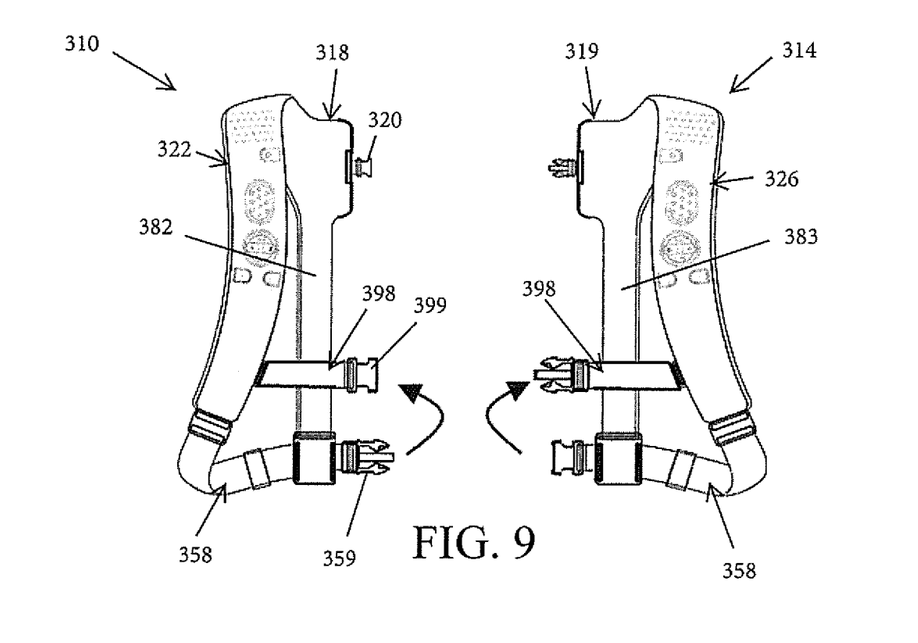
FIG. 9 is a front view of the portable, wearable radio of FIG. 8, showing the harness separated into two separate components each having a shoulder strap and adjustment straps.
Figure 10:
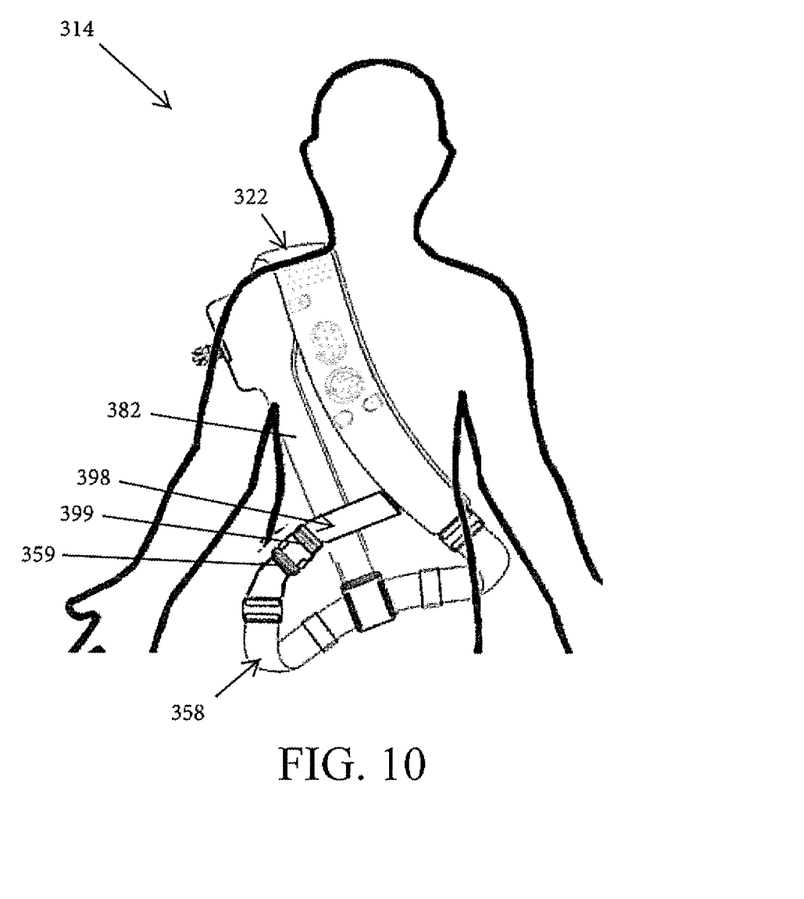
FIG. 10 is a front view of the portable, wearable radio of FIG. 8, showing one of the shoulder straps being used with the adjustment straps as a sling.

FIG. 8 through FIG. 10 illustrate yet another embodiment in the form of a portable, wearable radio 310. The portable, wearable radio 310 includes a harness 314 having a first neck strap 318, a second neck strap 319, and a neck strap buckle 320 that couples and uncouples the first neck strap 318 and the second neck strap 319. The harness 314 also includes a first shoulder strap 322, a second shoulder strap 326, a main adjustment strap 358, a first back adjustment strap 382, a second back adjustment strap 383, and a chest adjustment strap 398. As illustrated in FIG. 9, the harness 314 is generally symmetrical, and is separable and reconfigurable into two generally equal components, each component having either the first neck strap 318 or the second neck strap 319, the first shoulder strap 322 or the second shoulder strap 326, a portion of the main adjustment strap 358, a portion of the chest adjustment strap 398, and either the first back adjustment strap 382 or the second back adjustment strap 383.

As illustrated in FIG. 10, the harness 314 may be folded into a sling. For example, with reference to FIG. 8, the harness 314 includes a main adjustment strap buckle 359 and a chest adjustment strap buckle 399. When the harness 314 is separated into two components as illustrated in FIG. 9, the main adjustment strap buckle 359 may then be coupled to the chest adjustment strap buckle 399, to create a sling as shown in FIG. 10. As illustrated in FIG. 10, the first shoulder strap 322, the main adjustment strap 358, the first back adjustment strap 382, and the chest adjustment strap 398 create the single sling that may be worn over an operator's shoulder and secured around the operator's waist. The neck strap buckle 320, main adjustment strap buckle 359, and chest adjustment strap buckle 399 can be replaced with any other coupling and decoupling elements, for example zips, Velcro® hook and loop fasteners, magnets, strings and the like.

Figure 11:
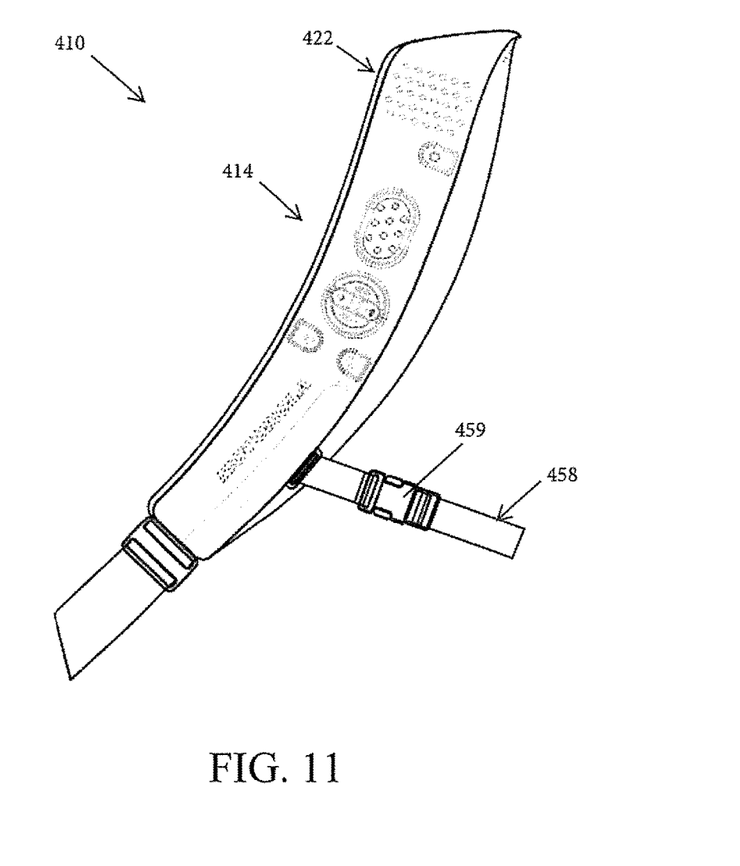
FIG. 11 is front view of a portable, wearable radio according to another embodiment, including a single shoulder strap used as a sling.
Figure 12:
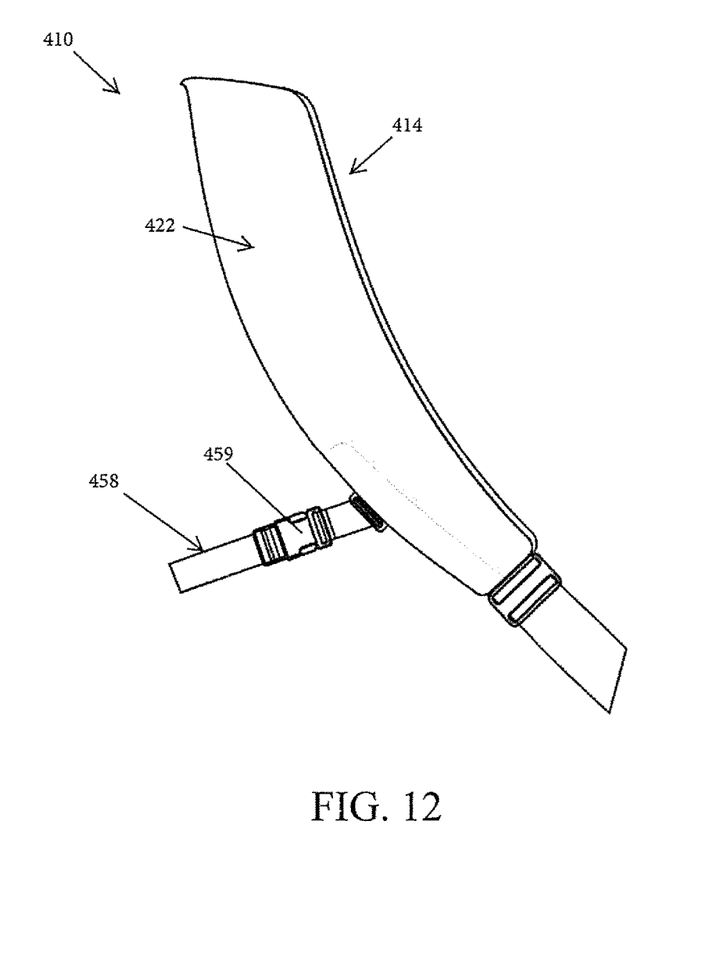
FIG. 12 is a rear view of the portable, wearable radio of FIG. 11.

Yet another embodiment is illustrated in FIGS. 11 and 12 in the form of a portable, wearable radio 410. The portable, wearable radio 410 includes a harness 414 forming a sling. The harness 414 includes a single shoulder strap 422, a main adjustment strap 458 coupled to the single shoulder strap 422 that is worn around the operator's waist, and a main adjustment strap buckle 459 that may be used to adjust the harness 414 for a given operator size and may be used to help take the harness 414 on and off.

Figure 13:
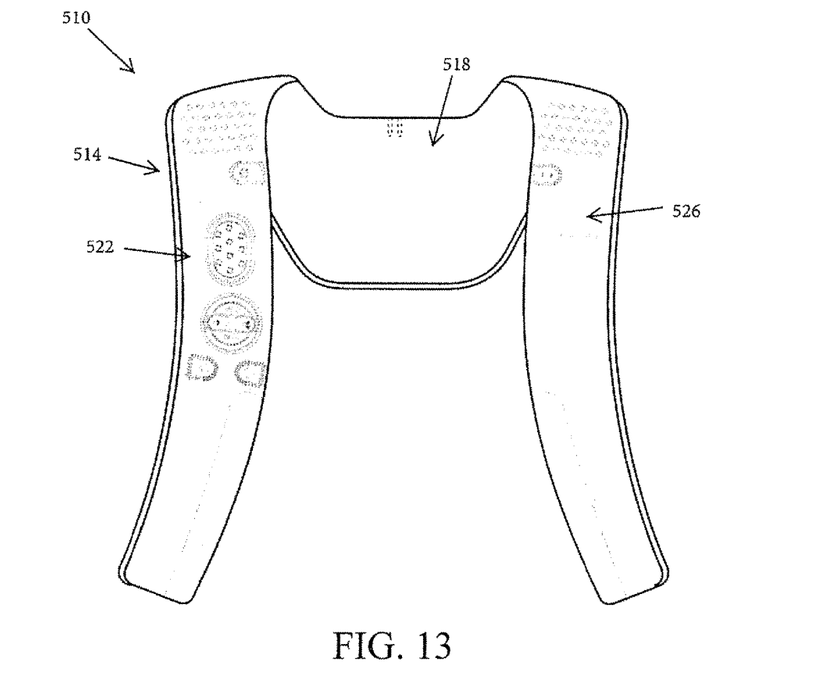
FIG. 13 is front view of a portable, wearable radio according to another embodiment.
Figure 14:
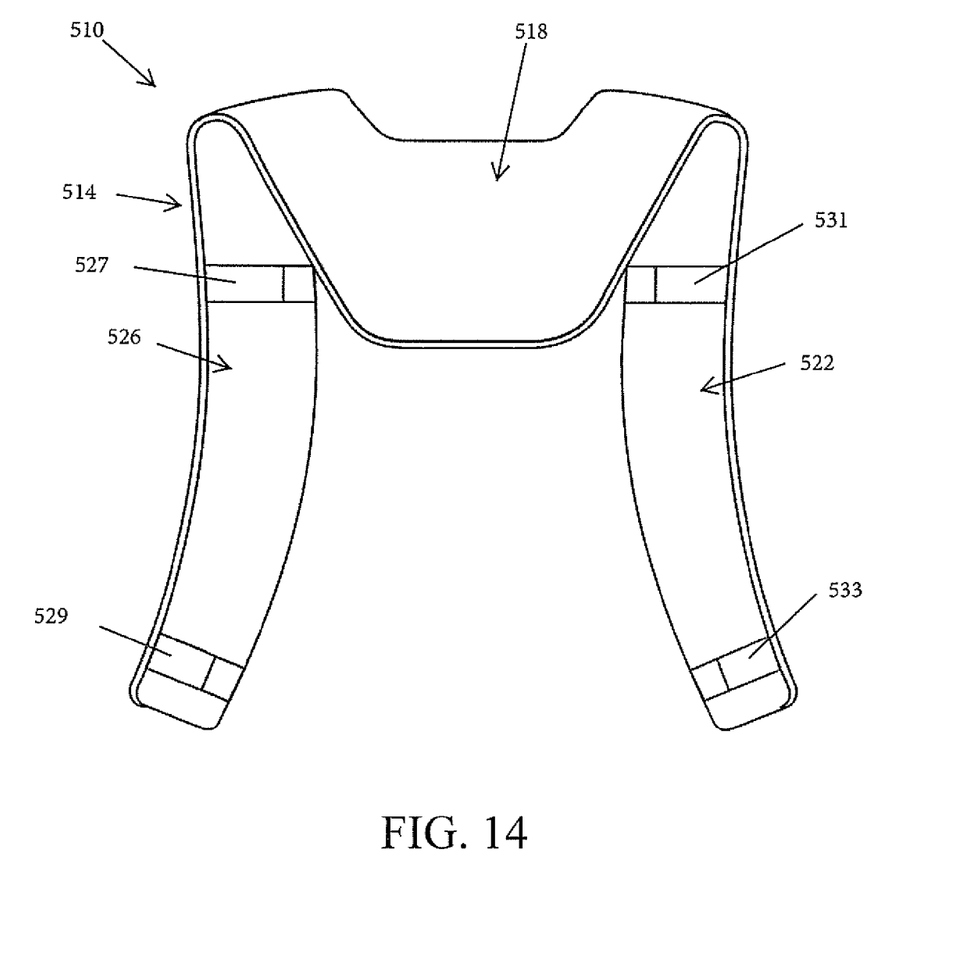
FIG. 14 is a rear view of the portable, wearable radio of FIG. 13, showing a harness having attachment regions to couple the harness to another worn item.

FIGS. 13 and 14 illustrate another embodiment in the form of a portable, wearable radio 510. The portable, wearable radio 510 includes a harness 514 having a neck strap 518, a first shoulder strap 522 coupled to the neck strap 518, and a second shoulder strap 526 coupled to the neck strap 518. As illustrated in FIG. 14, the portable, wearable radio 510 further includes a first attachment region 527 on the first shoulder strap 522, a second attachment region 529 on the first shoulder strap 522, a third attachment region 531 on the second shoulder strap 526, and a fourth attachment region 533 on the second shoulder strap 526. The attachment regions 527, 529, 531, 533 are used to removably couple the harness 514 to a separately worn item, including but not limited to a jacket, backpack, or other garment or structure. In some embodiments, one or more of the attachment regions 527, 529, 531, 533 includes Velcro® hook and loop fasteners, buttons, or other structures to removably couple the harness 514 to the other worn item.

While not illustrated, each of the portable, wearable radios 210, 310, 410, and 510 further includes a radio system (for example, the radio system 126 or another radio system) that is removably disposed within an interior of the harness 214, 214, 414, 514 (for example, similar to the interior 118 described above). In some embodiments, one or more of the harnesses 14, 214, 314, 414, 514 includes more than one interior, and/or more than one radio system disposed therein. In some embodiments, the radio system 126 described above may be modified from that illustrated in FIG. 5, such that the radio system 126 may fit within various harnesses including but not limited to the harnesses 214, 314, 414, and 514 described above. For example, in some embodiments the radio system 126 includes fewer or more than the radio components described above, or different configurations and arrangements of the radio components. In some embodiments, for example, the radio system 126 may include cameras, sensors, or other components. The radio system 126 illustrated in FIG. 5 is just one example of the radio system 126. Thus, other radio systems 126 include different radio components, separation of functions, arrangement of components and the like. In some embodiments, the radio system 126 includes antennas (for example located adjacent the first speaker-microphone 138 and the second speaker-microphone 154 on the operator's shoulders).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A portable, wearable radio comprising:
   a modular harness having the flexibility to be reconfigured into a plurality of different profiles, the modular harness having an interior; and
   a plurality of radio components removably disposed within the interior of the modular harness, wherein the plurality of radio components includes:

a first radio component, a second radio component electrically coupled to the first radio component via a first flexible electrical connector, and a third radio component electrically coupled to the first radio component via at least one of a group selected from the first flexible electrical connector and a second flexible electrical connector.

2. The portable, wearable radio of claim 1, wherein the first radio component is a control unit having an electrical controller, the second radio component is a speaker-microphone, and the third radio component is a radio frequency module.

3. The portable, wearable radio of claim 2, wherein the plurality of radio components further includes a push-to-talk button coupled to the speaker-microphone via a third flexible electrical connector.

4. The portable, wearable radio of claim 3, wherein the speaker-microphone is a first speaker-microphone, and wherein the plurality of radio components further includes a second speaker-microphone coupled to the electrical controller via a fourth flexible electrical connector.

5. The portable, wearable radio of claim 4, wherein the plurality of radio components further includes an emergency button coupled to the second speaker-microphone via a fifth flexible electrical connector.

6. The portable, wearable radio of claim 1, wherein the modular harness includes a neck strap, a first shoulder strap coupled to the neck strap, and a second shoulder strap coupled to the neck strap, and wherein the interior of the modular harness extends to each of the neck strap, the first shoulder strap, and the second shoulder strap.

7. The portable, wearable radio of claim 6, wherein the modular harness includes a main adjustment strap removably coupled to both the first shoulder strap and the second shoulder strap, and a back adjustment strap removably coupled to both the main adjustment strap and the neck strap.

8. The portable, wearable radio of claim 7, wherein the modular harness includes two back adjustment straps coupled to both the main adjustment strap and the neck strap.

9. The portable, wearable radio of claim 6, wherein the first radio component is disposed within the interior of the modular harness in the neck strap, and wherein the second radio component is disposed within the interior of the modular harness in the first shoulder strap.

10. The portable, wearable radio of claim 9, wherein the first radio component is a first speaker-microphone, and wherein the plurality of radio components further includes a second speaker-microphone, wherein the second speaker-microphone is disposed within the interior of the modular harness in the second shoulder strap.

11. The portable, wearable radio of claim 6, wherein the first shoulder strap includes an attachment region to removably couple the first shoulder strap to a separately worn item.

12. The portable, wearable radio of claim 1, wherein the modular harness includes a first neck strap and a second, separate neck strap removably coupled to the first neck strap via a buckle.

13. The portable, wearable radio of claim 12, wherein the modular harness includes a first shoulder strap coupled to the first neck strap and a second shoulder strap coupled to the second neck strap, a main adjustment strap coupled to the first shoulder strap, and a back strap coupled to both the main adjustment strap and the first shoulder strap, such that when the first neck strap is de-coupled from the second neck strap, the main adjustment strap and the back strap and the first shoulder strap may all be coupled together into a single sling to reconfigure a profile of the modular harness.

14. The portable, wearable radio of claim 1, wherein the modular harness includes a single shoulder strap, and a main adjustment strap coupled to the shoulder strap, wherein the main adjustment strap is configured to be worn around an operator's waist.

15. The portable, wearable radio of claim 1, wherein the modular harness includes a zipper, and wherein opening and closing the zipper exposes and closes off the interior of the modular harness, respectively.

16. The portable, wearable radio of claim 1, wherein the modular harness includes a chamber disposed within the interior of the modular harness, and wherein one of the plurality of radio components is disposed within the chamber.

17. The portable, wearable radio of claim 1, wherein the modular harness includes a plurality of adjustment straps to fit operators of different sizes.

18. The portable, wearable radio of claim 1, wherein the modular harness includes a chest adjustment strap that slides along a rail on the modular harness to fit operators of different sizes.

19. The portable, wearable radio of claim 1, wherein the modular harness is configured to fit over an operator's shoulders, wherein the second radio component is a first speaker-microphone configured to be disposed at a first shoulder of the operator, and wherein the plurality of radio components further includes a second speaker-microphone configured to be disposed at a second shoulder of the operator.

20. The portable, wearable radio of claim 1, wherein the plurality of radio components are substantially concealed by the modular harness when disposed within the interior of the modular harness.

21. The portable, wearable radio of claim 1, wherein the modular harness includes a first shoulder strap having a first attachment region and a second attachment region, and a second shoulder strap having a third attachment region and a fourth attachment region, wherein the first, second, third, and fourth attachment regions are used to removably couple the modular harness to a separately worn item.

22. The portable, wearable radio of claim 1, wherein the modular harness includes at least two harness elements selected from a group consisting of a neck strap, a shoulder strap, a main adjustment strap, a back adjustment strap, and a chest adjustment strap, and wherein the at least two harness elements are removably coupled to one another so that the modular harness may be reconfigured into a different profile.

23. The portable, wearable radio of claim 22, wherein the at least two harness elements are removably coupled to one another with hook and loop fasteners.

24. The portable, wearable radio of claim 22, wherein modular harness includes a main adjustment strap that includes a first adjustment strap end that is removably coupled to a first shoulder strap, and a second adjustment strap end that is removably coupled to a second shoulder strap.

25. The portable, wearable radio of claim 22, wherein the modular harness includes a shoulder strap that is removably coupled to a neck strap.

* * * * *